(12) United States Patent
Libby et al.

(10) Patent No.: US 7,804,026 B2
(45) Date of Patent: Sep. 28, 2010

(54) ENCLOSURE FOR WIRING DEVICES

(75) Inventors: Robert A. Libby, Williamsport, PA (US); Charles A. Libby, II, Montoursville, PA (US); Kyle Mason, Williamsport, PA (US); David E. Montgomery, Montoursville, PA (US)

(73) Assignee: Aslan Industries Corporation, Mountoursville, PA (US)

( * ) Notice: Subject to any disclaimer, the term of this patent is extended or adjusted under 35 U.S.C. 154(b) by 124 days.

(21) Appl. No.: 12/220,235

(22) Filed: Jul. 22, 2008

(65) Prior Publication Data

US 2010/0018739 A1 Jan. 28, 2010

(51) Int. Cl.
*H02G 3/08* (2006.01)

(52) U.S. Cl. .............. 174/58; 174/53; 174/57; 174/50; 439/535; 439/215; 439/211; 200/43.18

(58) Field of Classification Search .......... 174/50, 174/53, 57, 58; 439/535, 215, 211, 560; 200/43.18
See application file for complete search history.

(56) References Cited

U.S. PATENT DOCUMENTS

| | | | |
|---|---|---|---|
| 3,472,945 A | | 10/1969 | Trachtenberg |
| 5,399,806 A | * | 3/1995 | Olson .................. 174/53 |
| 5,594,207 A | | 1/1997 | Fabian et al. |
| 5,785,551 A | | 7/1998 | Libby |
| 5,975,938 A | | 11/1999 | Libby |
| 6,483,028 B2 | * | 11/2002 | DeBartolo et al. .......... 174/483 |
| 6,737,576 B1 | | 5/2004 | Dinh |
| 7,144,269 B2 | | 12/2006 | Libby et al. |
| 7,195,517 B1 | * | 3/2007 | Savicki, Jr. .............. 439/535 |
| 7,204,696 B1 | | 4/2007 | Libby, II et al. |
| 7,211,751 B1 | | 5/2007 | Libby, II |
| 7,281,941 B1 | | 10/2007 | Libby, II et al. |
| 7,410,379 B1 | * | 8/2008 | Byrne ...................... 439/215 |
| 7,569,771 B2 | * | 8/2009 | Nicholson ................. 174/58 |
| 7,638,710 B1 | * | 12/2009 | Vance ...................... 174/53 |
| 7,642,458 B2 | * | 1/2010 | Stockton ................... 174/53 |

* cited by examiner

*Primary Examiner*—Dhiru R Patel
(74) *Attorney, Agent, or Firm*—Thomas R. Shaffer

(57) ABSTRACT

An enclosure for wiring devices such as switches and receptacles is provided. A housing member has a main front chamber, a main rear chamber and a central dividing wall separating the front chamber from the rear chamber. The housing has an open front leading to the front chamber. The rear chamber is divided into a plurality of electrical feed ports through which electrical power is provided to and may be taken from the enclosure. The feed ports each have an open back providing access to the ports but not to the main front chamber. A front plate member sized to completely cover and seal the open front of said front chamber is permanently attached to the housing to make a fully enclosed factory sealed enclosure in the front chamber. The front chamber contains a wiring device. Hot, neutral and ground busses extend between and interconnect the feed ports. These busses have segments extending through the dividing wall and connected to a wiring device. The present invention is designed primarily for safety but because of the use of fewer components and because of a greater ease of installation, significant labor savings also result from the present invention.

13 Claims, 17 Drawing Sheets

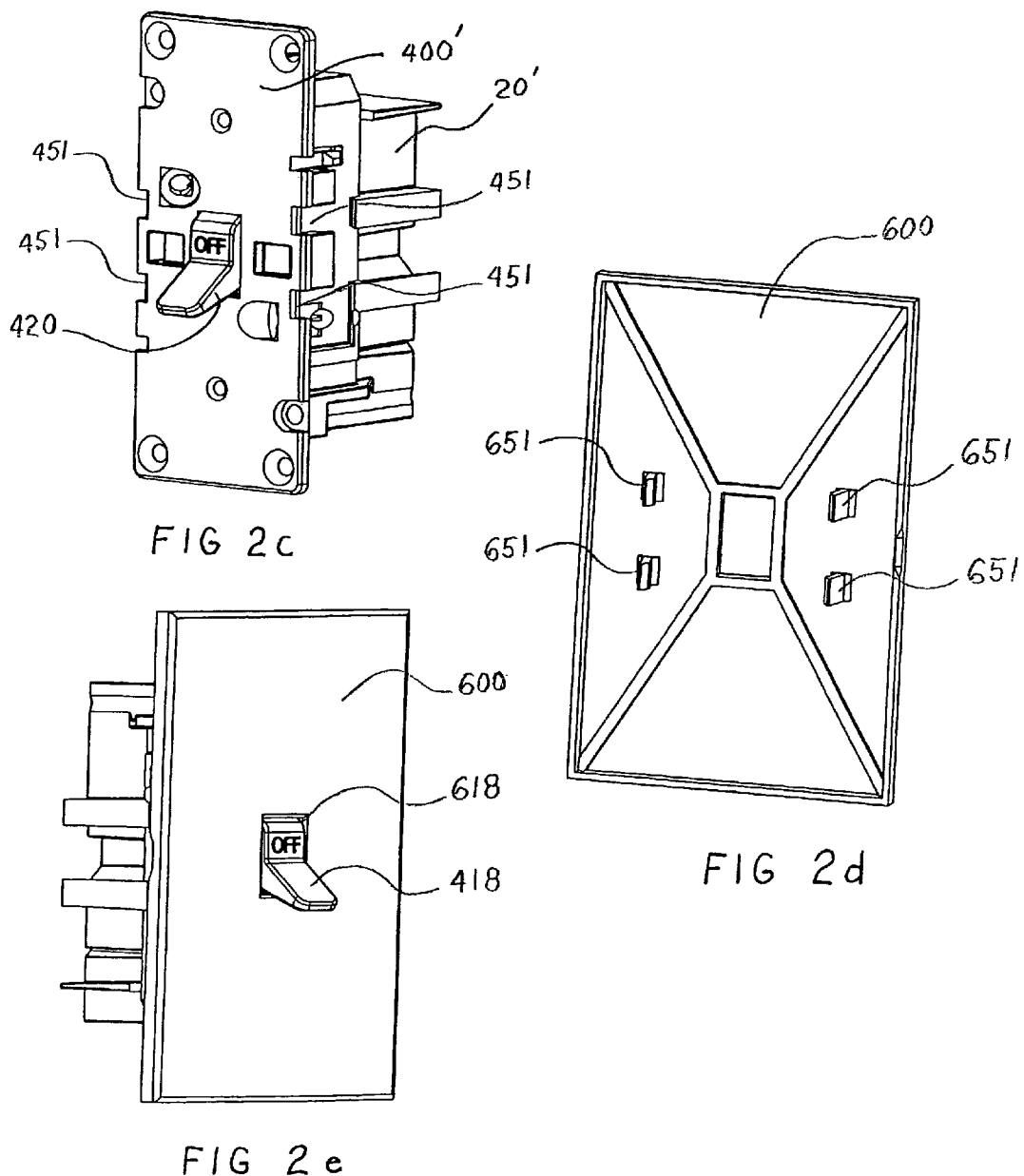

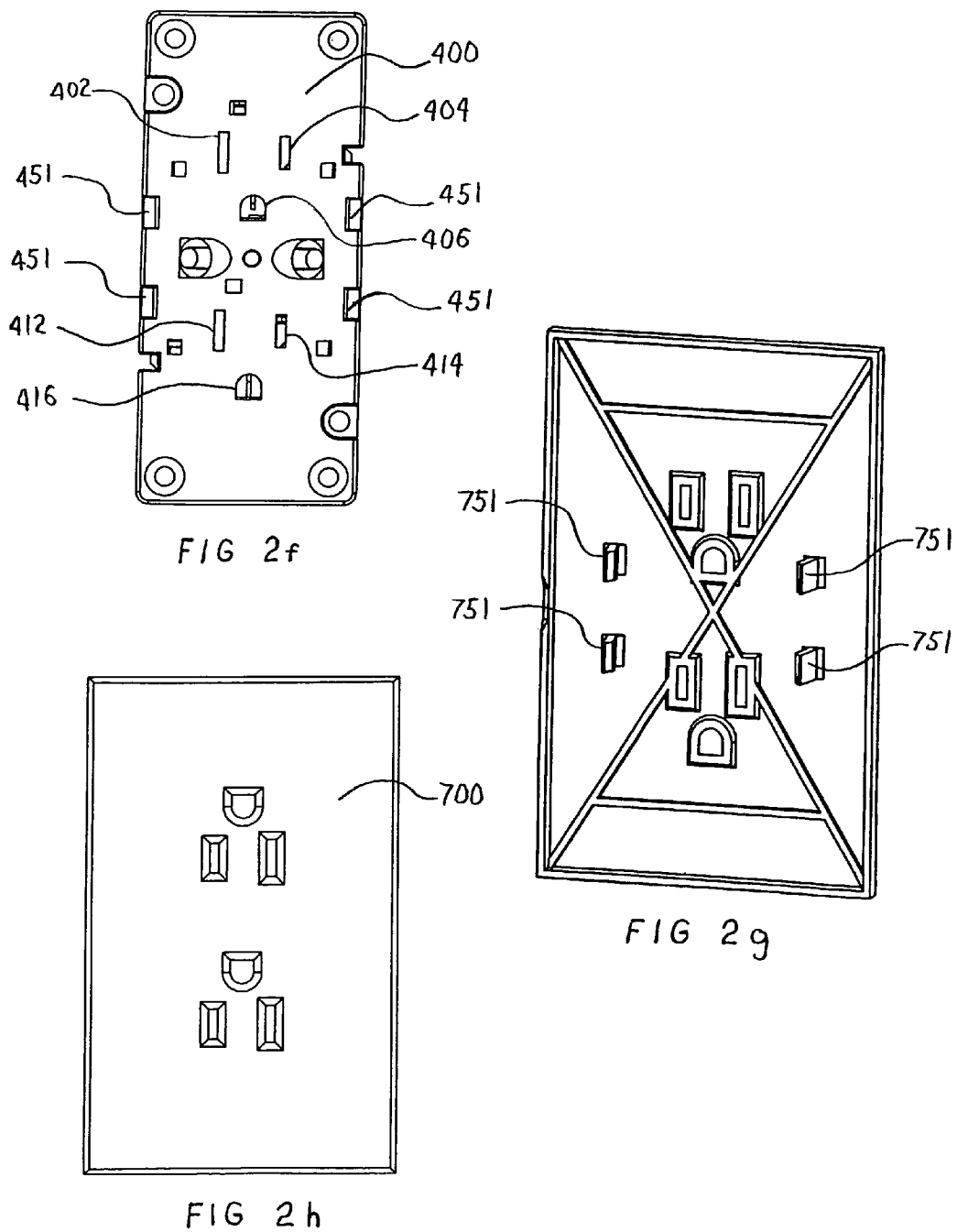

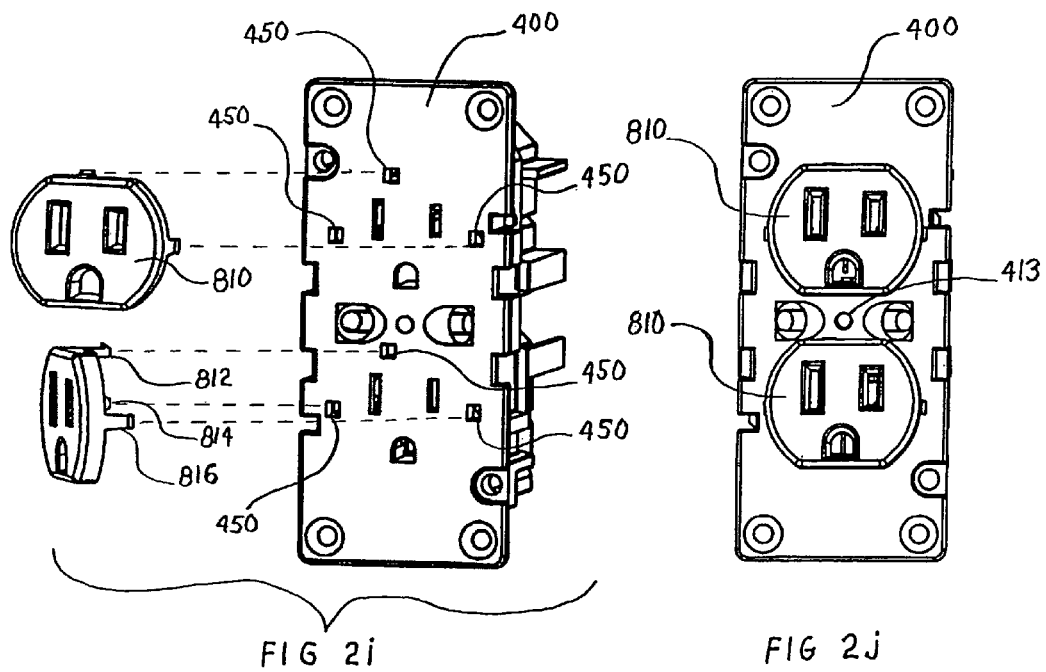
FIG 2i  FIG 2j
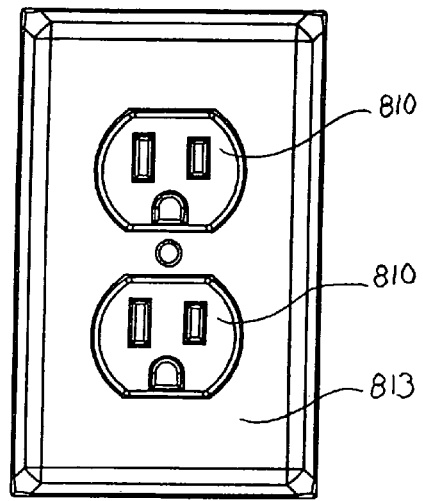
FIG 2ℓ
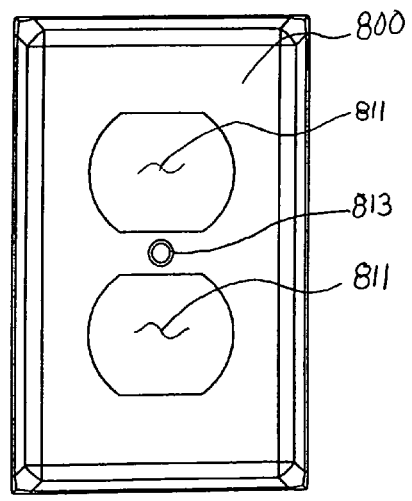
FIG 2k

US 7,804,026 B2

ENCLOSURE FOR WIRING DEVICES

BACKGROUND OF THE INVENTION

1. Field of the Invention

The present invention relates to an enclosure for electrical wiring devices. More specifically, it relates to an enclosure housing and mounting device for duplex receptacles, ground fault receptacles, switches, and dimmer controls.

2. Description of the Prior Art

Wiring devices such as a duplex outlet, a ground fault receptacle, a single pole or three way switch, dimmers, and the like are all electrical wiring devices that carry current or electricity to allow the consumer to conveniently control electrical current for use. These devices, because of their construction, have to be, by code, mounted in an enclosure or housing so that the device can be connected to electric cable which delivers the current to the device, and then mounted securely to the wall to complete installation. A prior art device in the form of a duplex receptacle mounted in a fixture box is shown in FIG. 1.

A prior art enclosure 10 for wiring device 12 is shown in FIG. 1 and FIG. 1a. The wiring device, which is in the form of a duplex receptacle 12, is mounted in a housing 11 by a pair of screws 14a which are screwed into screw holes 14 to secure the receptacle 12 to the housing 11. The receptacle includes screw terminals 13 that allow for the attachment of the cable conductors which provide the device with electric current. The device also has a ground terminal screw 17' and once assembled a large area of open space 16 remains and thus the device is not fully enclosed until an installer attaches a cover plate (not shown) by means of a screw placed into screw hole 18.

The prior art method of installing wiring devices as shown in FIG. 1 and FIG. 1a is still being used and is very time consuming and involved. For example, the electrician has to supply a two conductor with ground, non-metallic cable (NM-B or Romex®) to the wiring device. The cable is run to an enclosure. The insulating jacket or outer sheath of the cable is then stripped off. The individual conductors are then separated and the insulation removed from the ends of the conductor wires. The individual conductors are then wired to the screw terminals on the receptacle where required according to the circuit. The wiring device 12, in this case, a receptacle, is then installed to a previously mounted wall box or enclosure 11, by the use of mounting screws 14a placed in screw holes 14 provided in a grounded metal strap 15. If the electrician is feeding another wiring device from the one being installed, the wires are terminated in the box, using twist-on wire connectors and a pigtail wire in which the pigtail will run back to the wiring device for the connection. A ground wire is also required and has to be connected to a ground screw on the wiring device.

Referring specifically to FIG. 1a, it can be seen that a pair of N-MB or Romex® cables 19 are utilized to provide power to the receptacle 12. The insulating jacket or outer sheath of the cables 19 is stripped off and the individual connectors 19a, 19b and 19c are each also stripped and are then pigtailed with twist-on wire connectors 17 to hot, neutral and ground conductor wires 17a, 17b and 17c, respectively which provide power to the receptacle.

The concept of providing a modular system wherein male plugs would simply be inserted into corresponding female ports built into a pre-wired switch is suggested by Libby, U.S. Pat. No. 5,785,551. The Libby '551 patent teaches that it is desirable to reduce and simplify the number of steps required in wiring an electrical power distribution system and to make electrical connections without the need to strip the ends of the individual conductors in an electrical cable. FIGS. 1a-d and 12 of Libby '551 show and describe the use of a box into which male cable plugs are inserted into female connectors 46 provided in the box to simplify the wiring of the box. Libby II, U.S. Pat. No. 7,211,751, in FIGS. 20 and 21 teaches the provision of a sealed switch enclosure 400. Libby II et al., U.S. Pat. No. 7,204,696 teaches the provision of a fixture box which is fully enclosed and in FIG. 7 shows a front plate member having various openings therein and a plurality of electrical feed ports in the back. The present invention relates to a new design in which the electrical wiring device is enclosed in a separate front chamber of its own mounting box or enclosure.

SUMMARY OF THE INVENTION

The newly design wiring device enclosure of the present invention will eliminate the time of manually stripping away the insulated jacket and individual conductors by use of Q-CEB (Quick-Connect Electrical Box) connectors as described in Libby, U.S. Pat. Nos. 5,975,938 and 7,144,269B2 and 7,281,941. The wiring device, whether it be a receptacle outlet, a switch, a ground fault receptacle, a three or four way switch, or a dimmer control switch, will be installed in their own enclosure and factory sealed to provide safety and quick mounting.

The present invention in its simplest form provides an enclosure for wiring devices comprising:

a) a housing member, said housing member having a main front chamber, a main rear chamber and a central dividing wall separating said main front chamber from said main rear chamber, said housing having an open front leading to said main front chamber, said rear chamber being divided into a plurality of electrical feed ports through which electrical power is provided to and may be taken from said enclosure, said feed ports each having an open back providing access to said ports but not to said main front chamber;

b) a front plate member sized to completely cover and seal said open front of said main front chamber, said front plate member permanently attached to said housing whereby a fully enclosed factory sealed enclosure is created in said main front chamber, said main front chamber containing at least one wiring device of the type including receptacles and electric switches, such as, duplex receptacles, ground fault receptacles, electric switches, and dimmer switches, said front plate member having at least one opening therein adapted to receive one of a control member of a switch and hot, neutral and ground prongs of a grounded electrical plug which plugs into a receptacle;

c) a hot bus extending between and interconnecting said feed ports, said hot bus having a hot bus segment extending through said dividing wall and connected to said at least one wiring device;

d) a neutral bus extending between and interconnecting said feed ports, said neutral bus having a neutral bus segment extending through said dividing wall and connected to said at least one wiring device;

e) a ground bus extending between and interconnecting said feed ports, said ground bus having a ground bus segment extending through said dividing wall and connected to said at least one wiring device.

Preferably said enclosure has an exterior and said feed ports are accessible from the exterior of the enclosure. Preferably, three to four feed ports are provided in said main rear chamber with each of said ports capable of being connected to an electrical circuit and operating as one of an input port and an output port.

Preferably, at least one snap or knock out cover is provided to completely cover said open back of said feed ports whereby removal of said snap or knock out cover exposes said feed port for use. By code, these covers can only be removed with a screwdriver.

Preferably, the enclosure further comprises stud mounting holes provided in said housing for mounting said enclosure onto a stud in a wall by using a screw. Preferably said enclosure also has wood mounting holes provided on said housing for mounting said enclosure onto wood or hardboard. Preferably, the enclosure further includes screw clamp holes provided in said housing designed to accept a screw clamp for the mounting of said enclosure in the middle of a wall where no stud is present.

Preferably, the enclosure further comprises channels for accepting a gang pin for the purpose of ganging said enclosed electrical devices. Preferably the enclosure further comprises a built in tab designed to move out of the channel area as the gang pin is inserted and then springs back into place to lock the gang pin in place.

Preferably, the enclosure further comprises slots on said front plate for the purpose of accepting a designed wall cover plate.

Preferably, the enclosure further comprises ports engineered to accept tabs on a receptacle insert cover.

Preferably, the enclosure further comprises built in ribs for self leveling.

Preferably, the enclosure is factory sealed and has an interior which is inaccessible to an installer.

Preferably, input ports and said output ports each provide a separate and independent connection to said power bus.

BRIEF DESCRIPTION OF THE FIGURES

FIG. 2c is a perspective view of the housing of the present invention adapted to receive a switch cover.

FIG. 2d is a back view of a switch cover.

FIG. 2e is a perspective view of the enclosure of the present invention with a switch cover attached.

FIG. 2f is a front view of an enclosure adapted to receive a receptacle cover.

FIG. 2g is a perspective view of the rear of a receptacle cover.

FIG. 2h is a front view of a receptacle cover as attached to the cover.

FIG. 2i is a perspective view in exploded form showing receptacle inserts adapted for insertion onto an enclosure.

FIG. 2j is a front view showing an enclosure having receptacle inserts thereon.

FIG. 2k is a front view showing a receptacle cover having openings for the receptacle inserts.

FIG. 2l is a front view of an enclosure having both receptacle inserts and a receptacle cover thereon.

DETAILED DESCRIPTION OF THE PREFERRED EMBODIMENTS

The following descriptions, by way of drawings, will explain and illustrate the many features designed into the new invention for electrical wiring devices.

Figure 4:
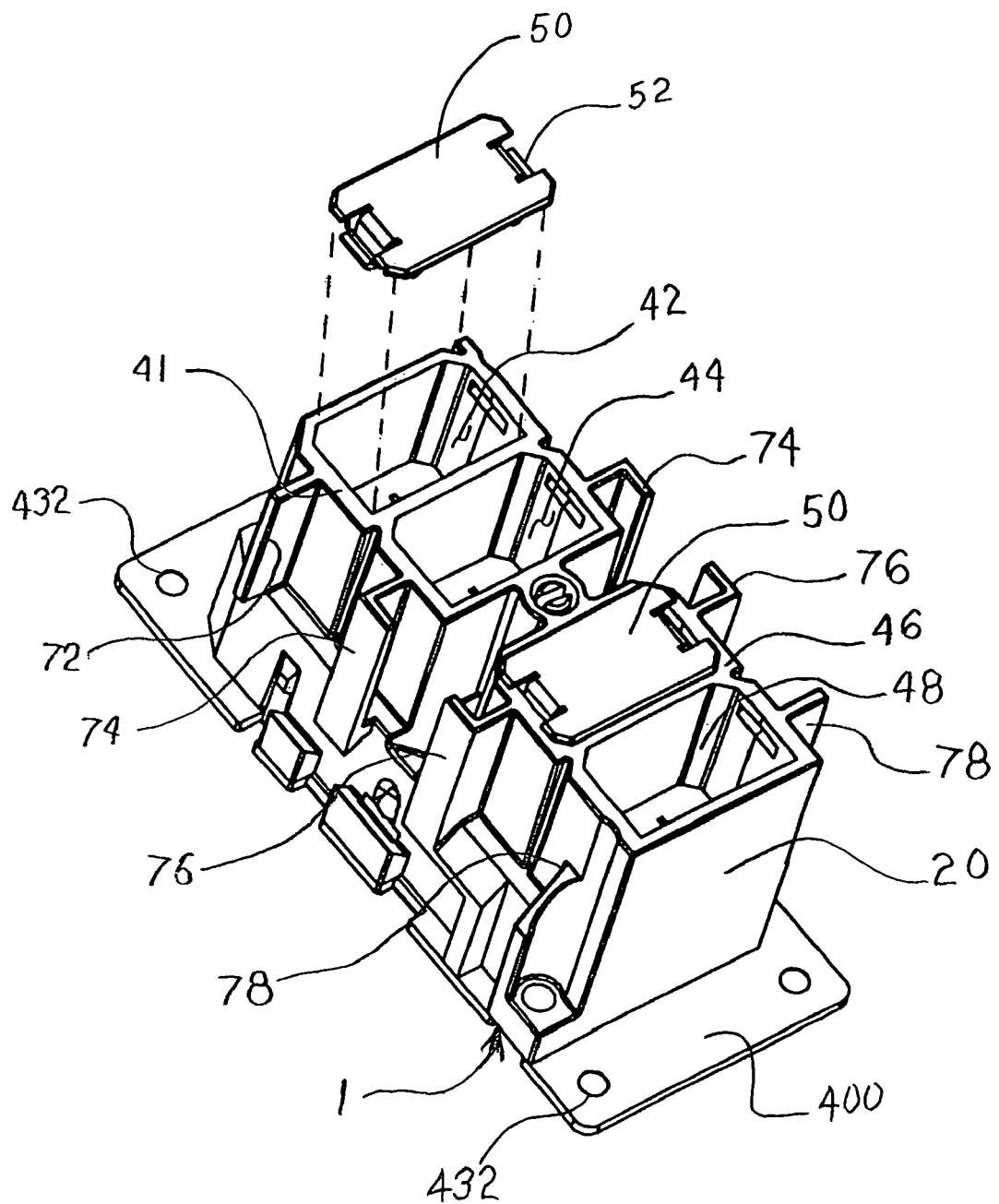
FIG. 4 is a perspective view of the rear of the enclosure of the present invention showing plural feed ports.
Figure 4A:
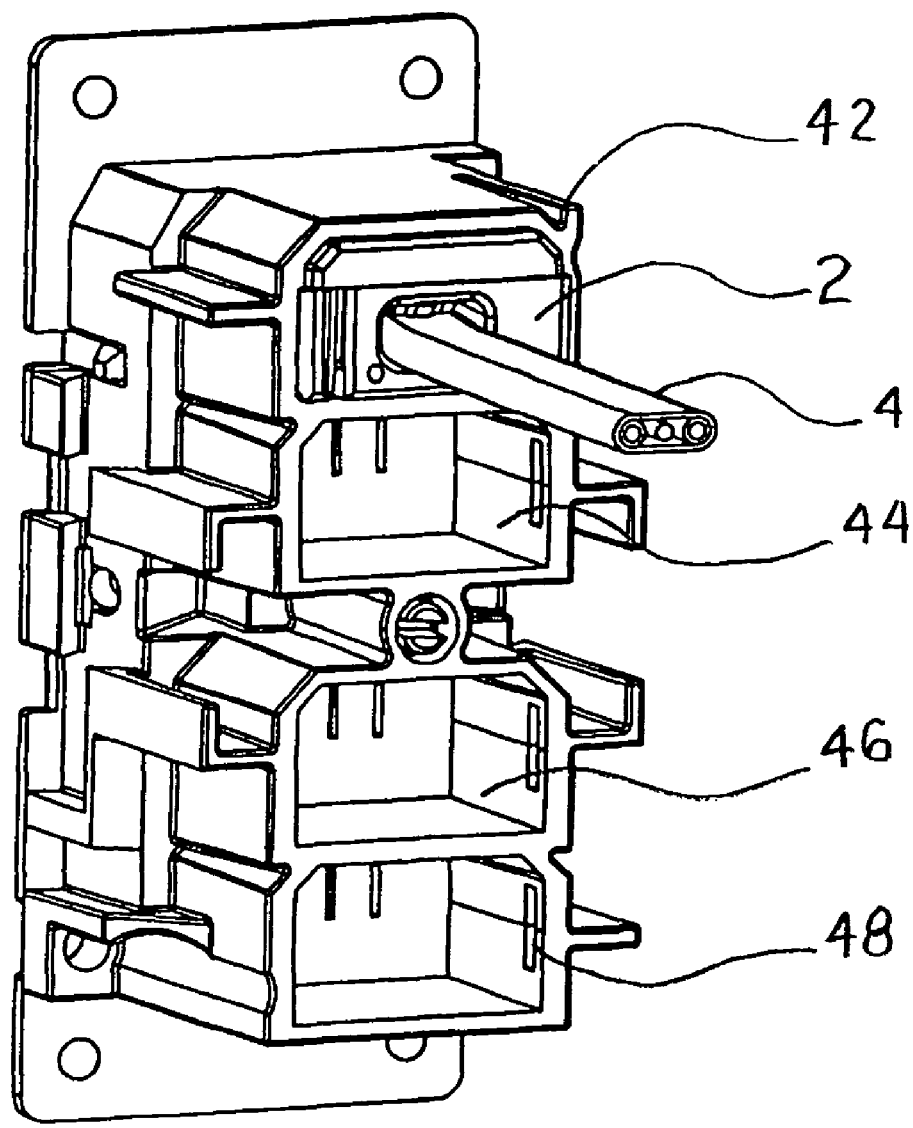
FIG. 4a is a perspective view showing a Q-CEB electrical connector of the type disclosed in Libby II, U.S. Pat. No. 7,281,941 connected to an NM-B cable the Q-CEB connector inserted into the enclosure.
Figure 9:
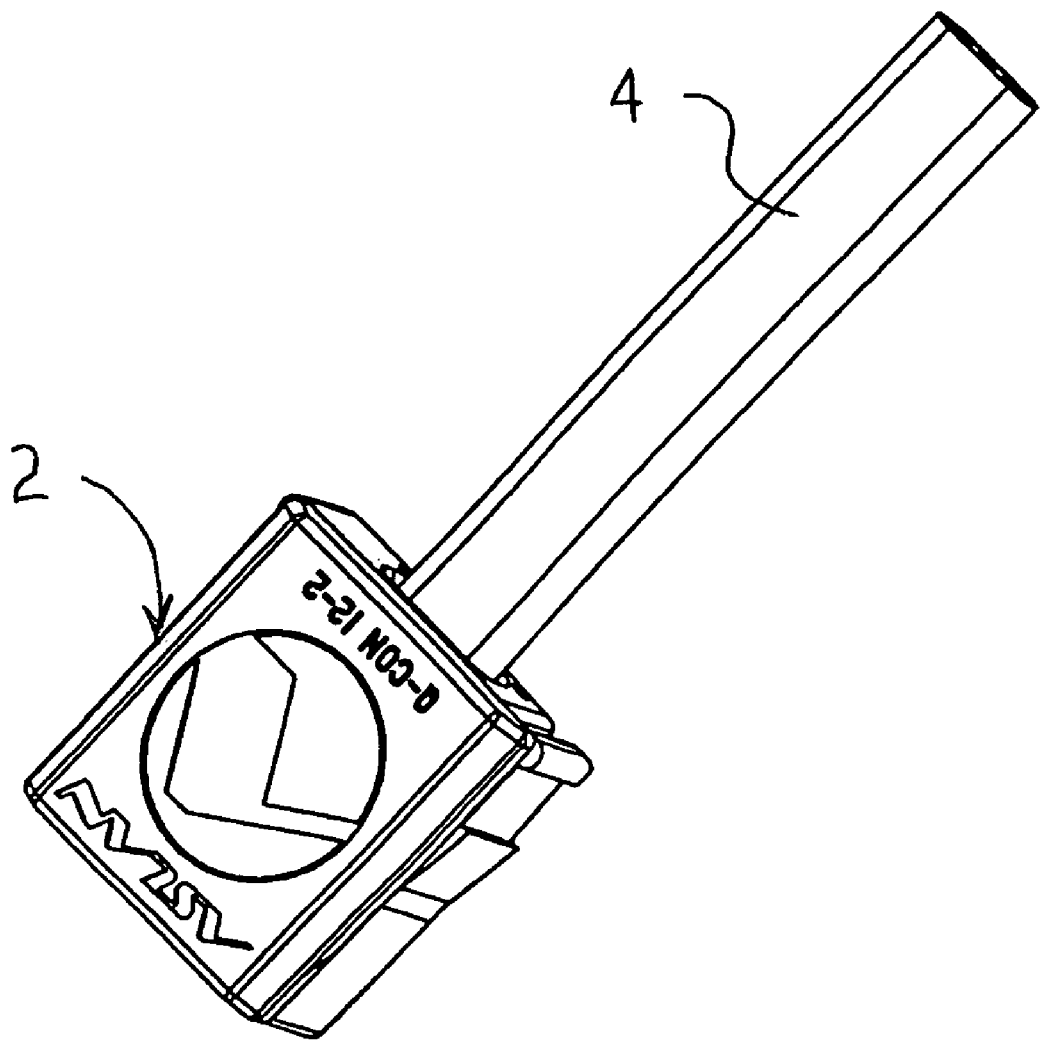
FIG. 9 a perspective view of a Q-CEB electrical connector of the type disclosed in Libby II. U.S. Pat. No. 7,281,941 a connected to an NM-B cable.

The enclosure 1 for electrical wiring devices of the present invention is designed to perform many functions. FIG. 4, shows four ports, 42, 44, 46 and 48 although the present invention can have just three rather than four ports. These ports will accept the new Q-CEB connector 2 which terminates the NM-B cable 4 (see FIG. 9) carrying the electric current or power to the wiring device and also carries the current back out of the device to another wiring device if needed in the electrical circuit.

Figure 2:
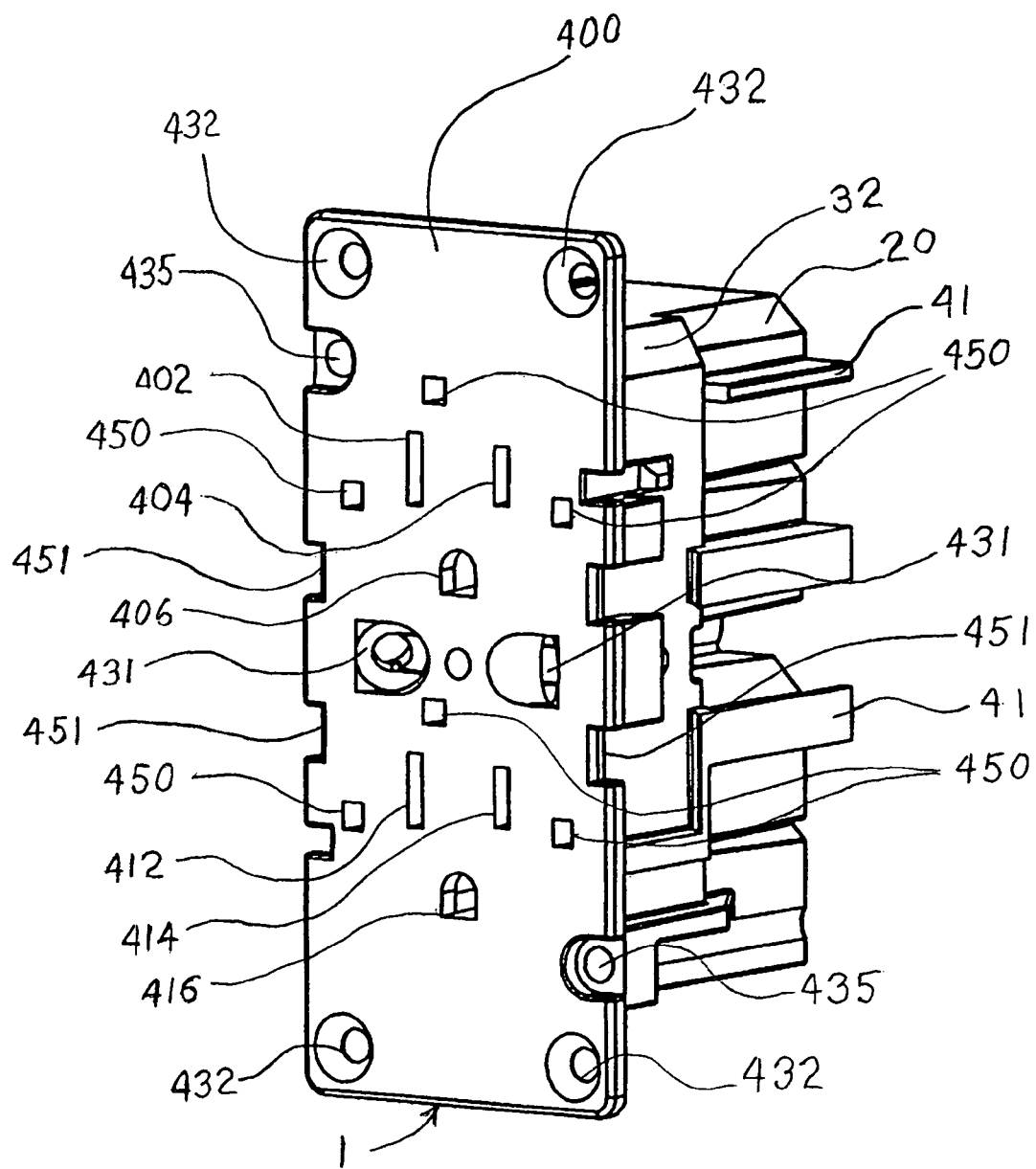
FIG. 2 is a perspective view of the front of the enclosure of the present invention showing an attached front plate member.
Figure 3:
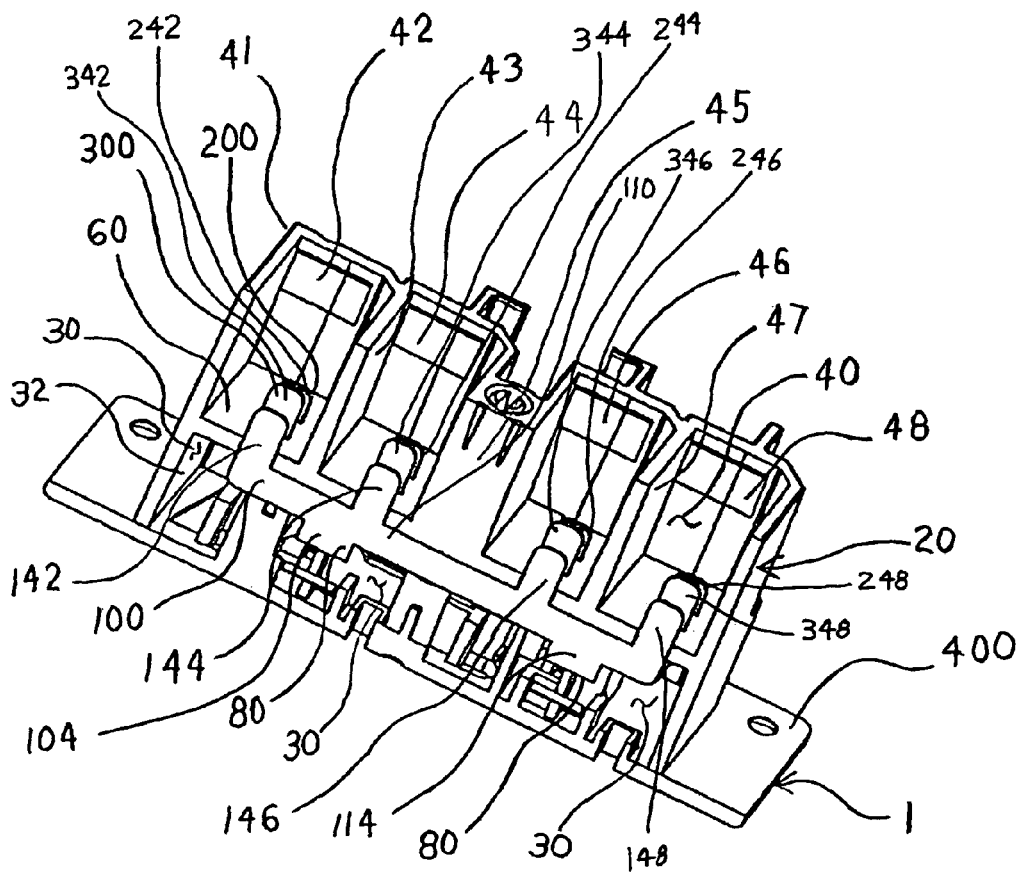
FIG. 3 is a perspective sectional view showing the interior of the enclosure of the present invention.

Referring specifically to FIGS. 2, 3 and 4 the enclosure 1 of the present invention will be more fully described. The enclosure for wiring devices includes a housing member 20. Said housing member 20 has a main front chamber 30, a main rear chamber 40 and a central dividing wall 60 separating said main front chamber 30 from said main rear chamber 40. The housing 20 has having an open front 32 leading to said main front chamber 30. The rear chamber 40 is divided into a plurality of electrical feed ports 42, 44, 46, 48 through which electrical power is provided to and may be taken from said enclosure. Said feed ports 42, 44, 46 and 48 each having an open back 41 providing access to said ports but not to said main front chamber. As can be seen from FIG. 3, the ports 42, 44, 46 and 48 are created within the rear chamber 40 by port dividing wall members 43, 45 and 47.

Figure 1:
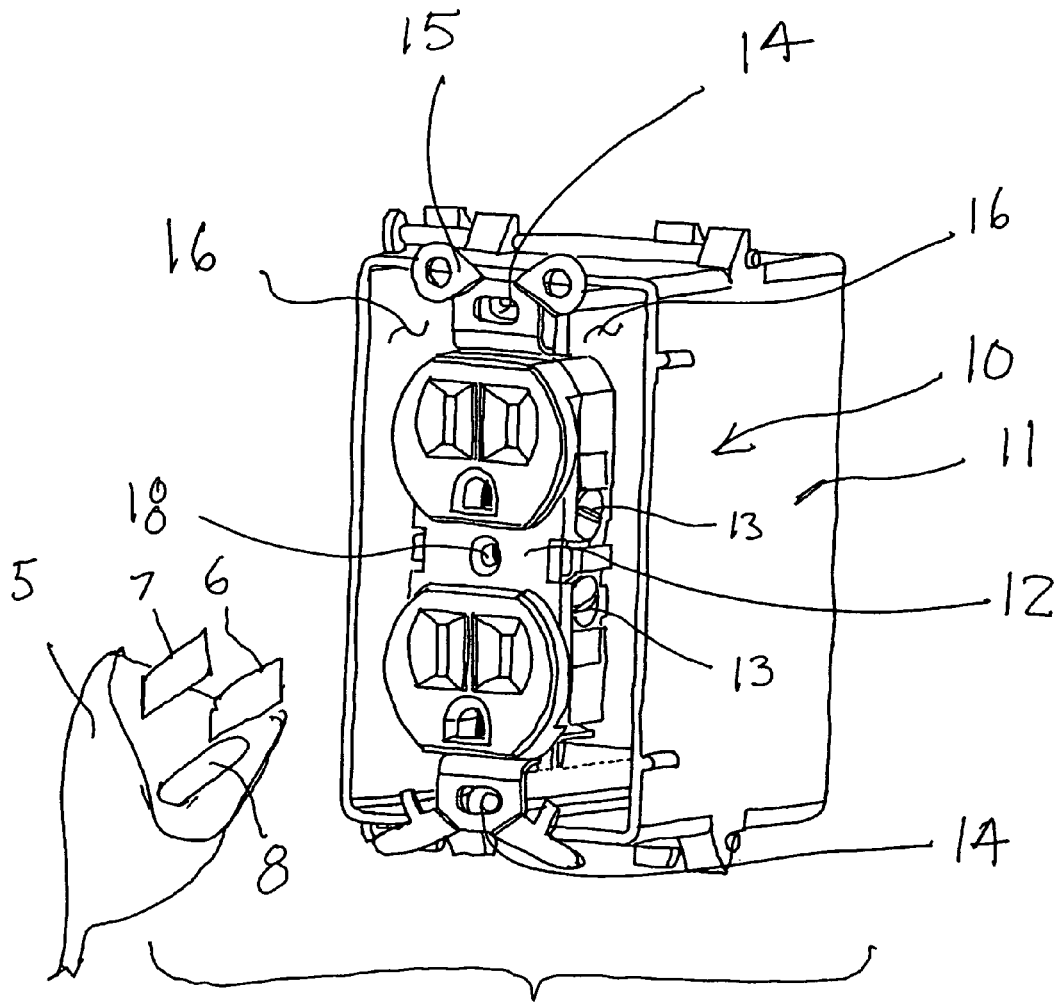
FIG. 1 is a perspective view of a prior art duplex receptacle housing and typical electrical plug.
Figure 1A:
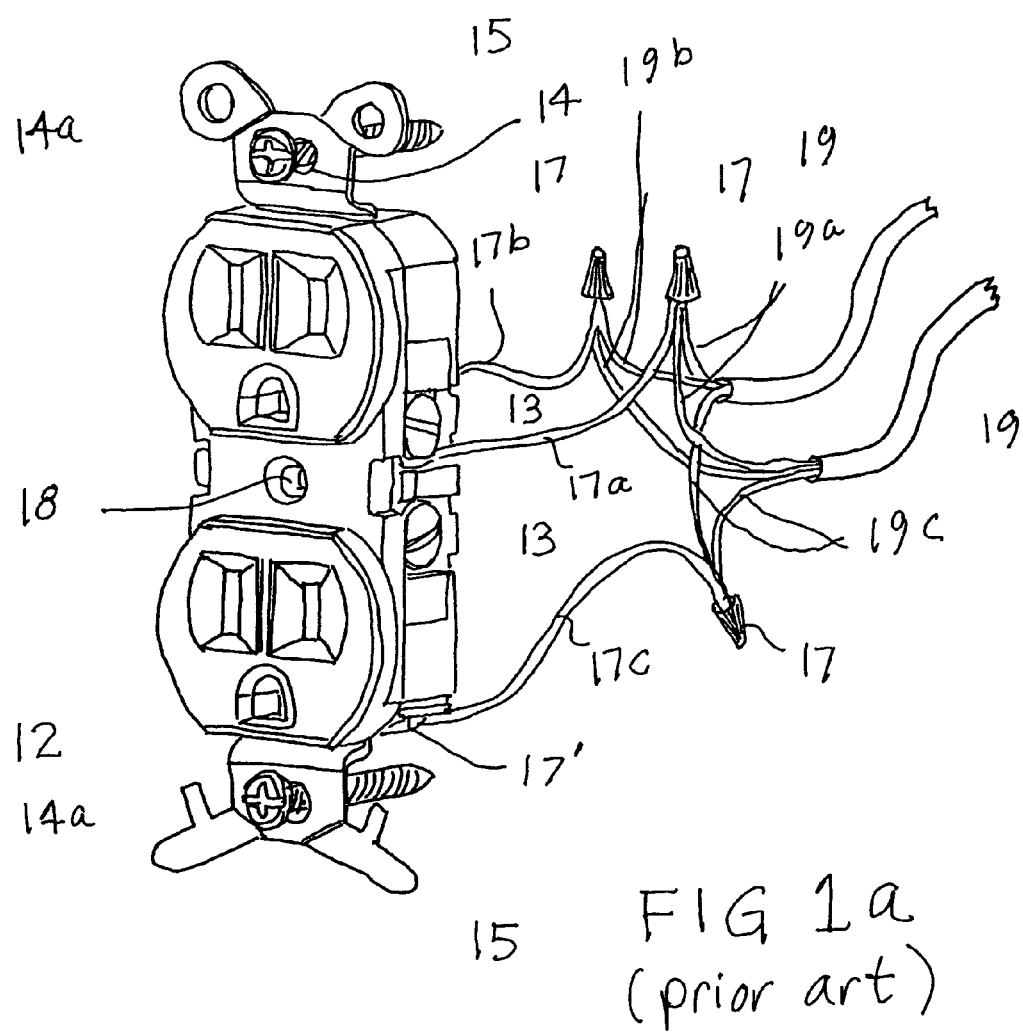
FIG. 1a is a perspective view of a prior art duplex receptacle as wired to a two conductor with ground, non-metallic cable.

A front plate member 400 is provided which is sized to completely cover and seal said open front 32 of said main front chamber 30. The front plate member 400 is permanently attached to said housing 20 whereby a fully enclosed factory sealed enclosure 1 is created in said main front chamber 30. The main front chamber 30 contains at least one wiring device 80. In FIGS. 2-4 the wiring device 80 is a duplex receptacle and in FIGS. 5-8 the wiring device is in the form of a single pole electrical switch. The wiring device 80 can include any type of receptacle or electric switch including but not limited to duplex receptacles, ground fault receptacles, electric switches, and dimmer switches, for example. The front plate member 400 has at least one opening 402, 404, 406, 412, 414, 416 (FIG. 2), 418 (FIG. 5) therein. Openings 402, 404 and 406 and openings 412, 414 and 416 as shown in FIG. 2 are each adapted to receive the hot prong 6, neutral prong 7 and ground prong 8 of a grounded electrical plug 6 (FIG. 1). Opening 418 as shown in FIGS. 5-8, is adapted to receive a control member 420 of a switch.

Referring to FIG. 3, a hot bus 100 extends between and interconnects said feed ports 42, 44, 46 and 48. The hot bus 100 has hot bus segments 149, 144, 146 and 148 which extend through said dividing wall 60 and connect to said at least one wiring device 80. The hot bus 100 has a central bar segment 110 which extends from essentially the top to the bottom of the enclosure. At spaced apart locations along one side of the central bar 110 the hot bus segments 142, 144, 146 and 148 extend through the dividing wall 60 and into the ports 42, 44, 46 and 48, respectively. Hot bus wiring device segments 104 and 114 extend from an opposite side of the central bar 100 and provide an electrical connection to the locations of 402 and 412 (FIG. 2) of the wiring device 80

A neutral bus 200 and a ground bus 300 each likewise extend between and interconnecting said feed ports 42, 44, 46 and 48 and neutral bus segments and ground bus segments which extend through said dividing wall 60 and connected to said at least one wiring device 80. Because the structure of the neutral bus 200 and the ground bus 300 are virtually identical to the structure of hot bus 100 described above, no further description is required other than to say that the neutral wiring device segments provide an electrical connection to the location of openings 404 and 414 and the ground wiring device segments provide an electrical connection to the location of openings 406 and 416.

As shown in FIG. 4, snap on or knock out covers 50 may provided to completely cover said open back of said feed ports 42, 44, 46 and 48 whereby removal of said snap on or knock out cover 50 exposes said feed port for use. It will be obvious that such covers 50 are intended to be placed over feed ports 42, 44, 46 and 48 that are not being used to receive a Q-CEB connector of the type described in Libby II. U.S. Pat. No. 7,281,941 and shown in FIG. 9 hereof.

Figure 5:
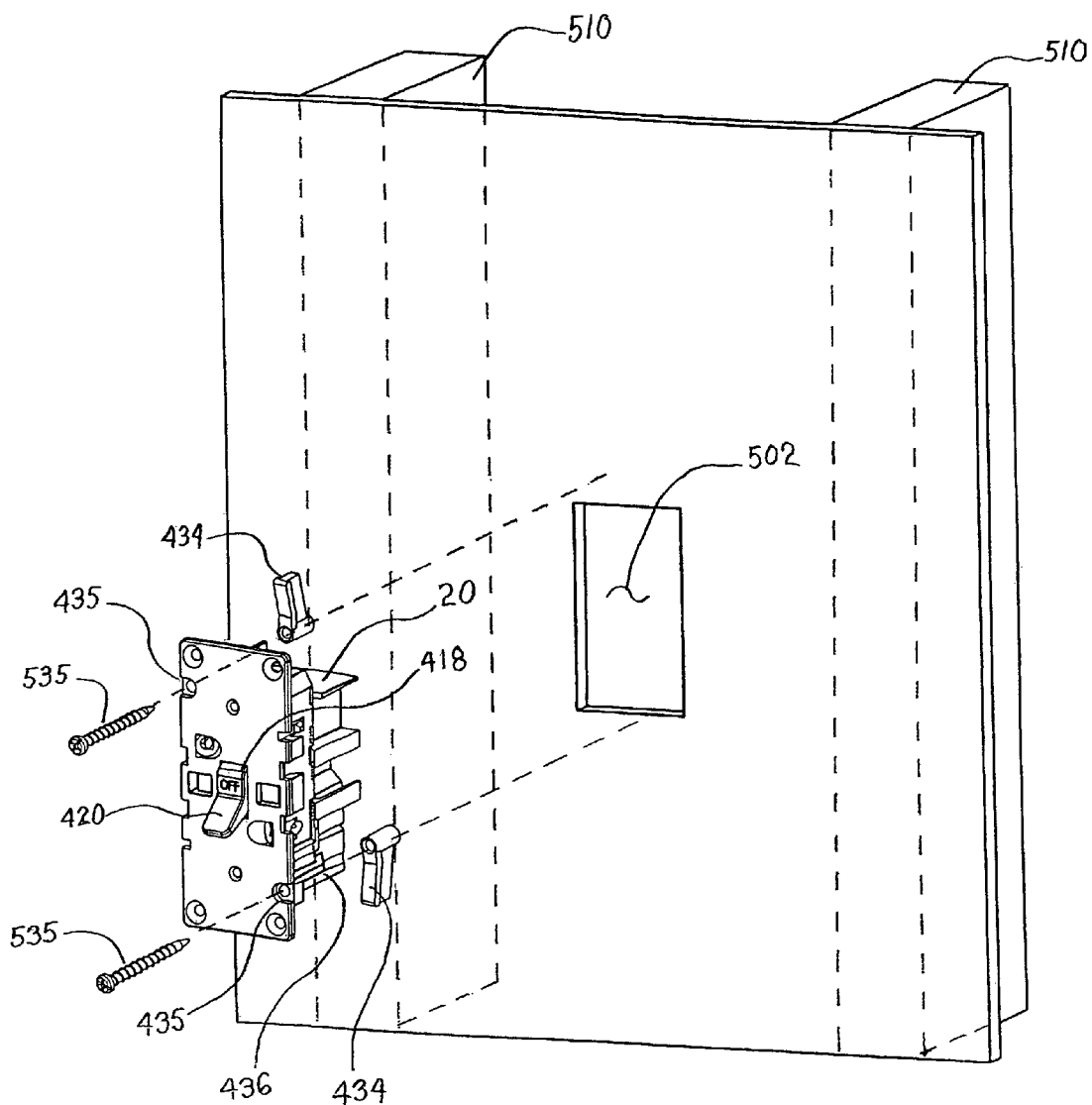
FIG. 5 is a perspective view in exploded form showing an enclosure of the present invention before being mounted to a wall in an area between two studs by means of screw clamps.
Figure 6:
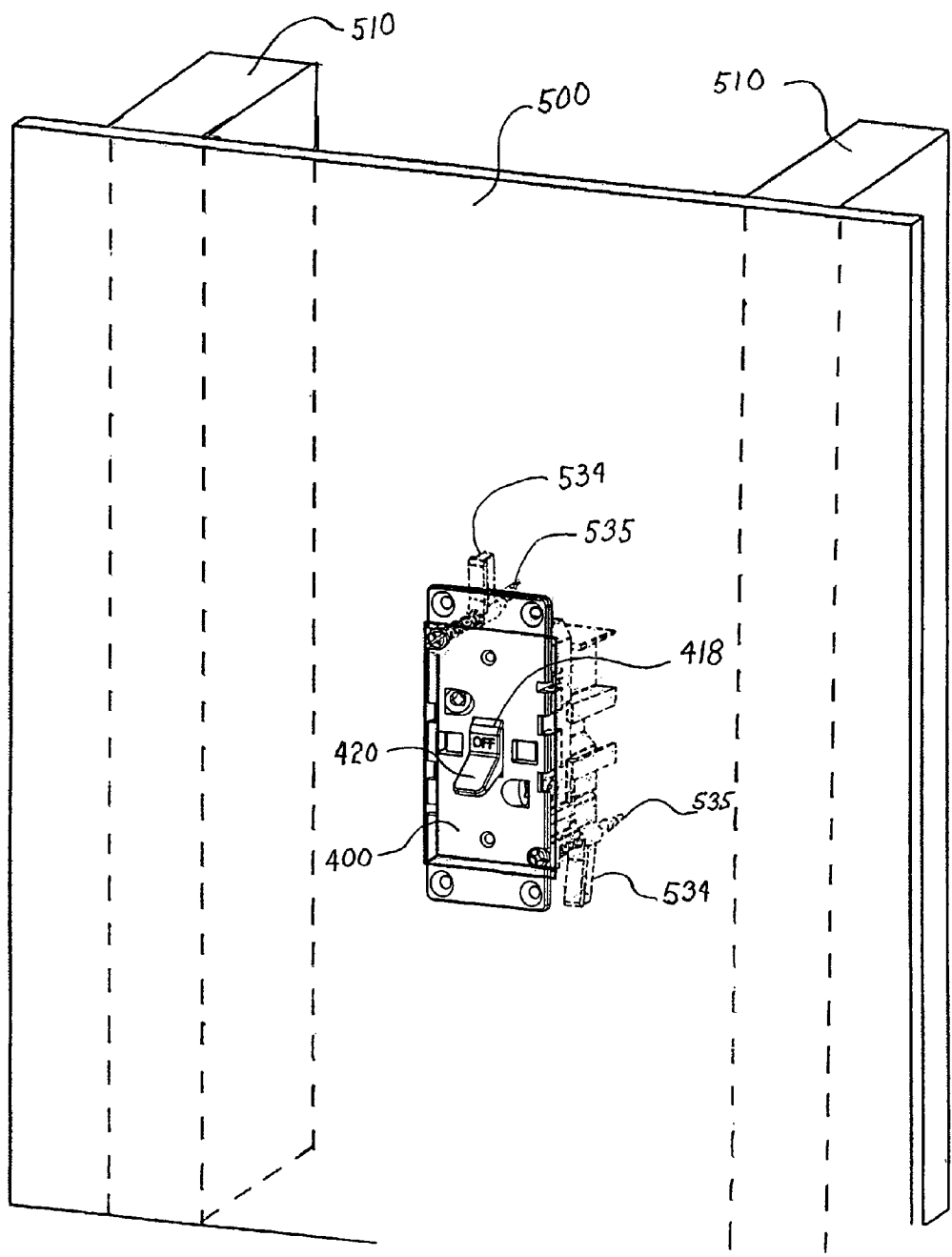
FIG. 6 is a perspective view showing an enclosure of FIG. 5 as mounted to the wall.

Now referring to FIGS. 5 through 9 a variety of different mounting arrangements are shown to attach the enclosure to various type of wall at various different locations. Referring first to FIGS. 5 and 6, a pair of screw clamp holes 435 are provided in opposite corners of the front plate 400 of the housing 20 which are designed to accept screw clamps 434 for the mounting of said enclosure 20 in an opening 502 located in the middle of a wall 500 where no stud 510 is present. Clamp screws 535 are utilized to secure and tighten the screw clamps 434 to a back surface of the wall 500 and thus holing the enclosure 20 in place.

Figure 7:
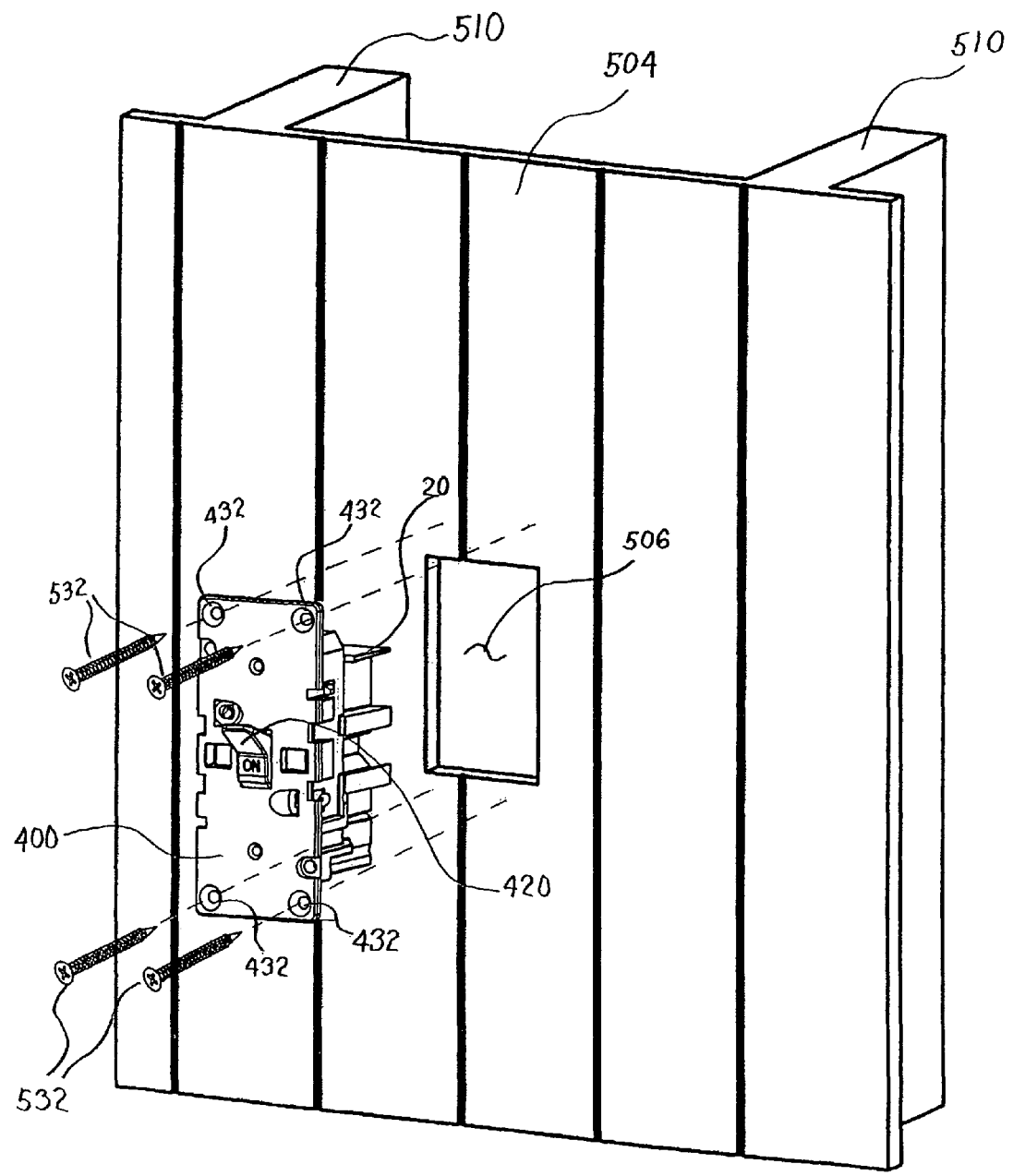
FIG. 7 is a perspective view in exploded form showing an enclosure of the present invention before being mounted to a wood or hardboard wall by wood screws.

Referring to FIG. 7 the front plate 400 of the enclosure 20 is provided with four openings 432 located in each corner of the front plate. Wood screws 532 are placed through the openings 432 and are utilized to secure the enclosure in an opening 506 located in a wood or hardboard wall 504 at a location between adjacent studs 510. Because of the strength of the wood or hardboard wall, the screw clamps described above are not needed in this situation.

Figure 8:
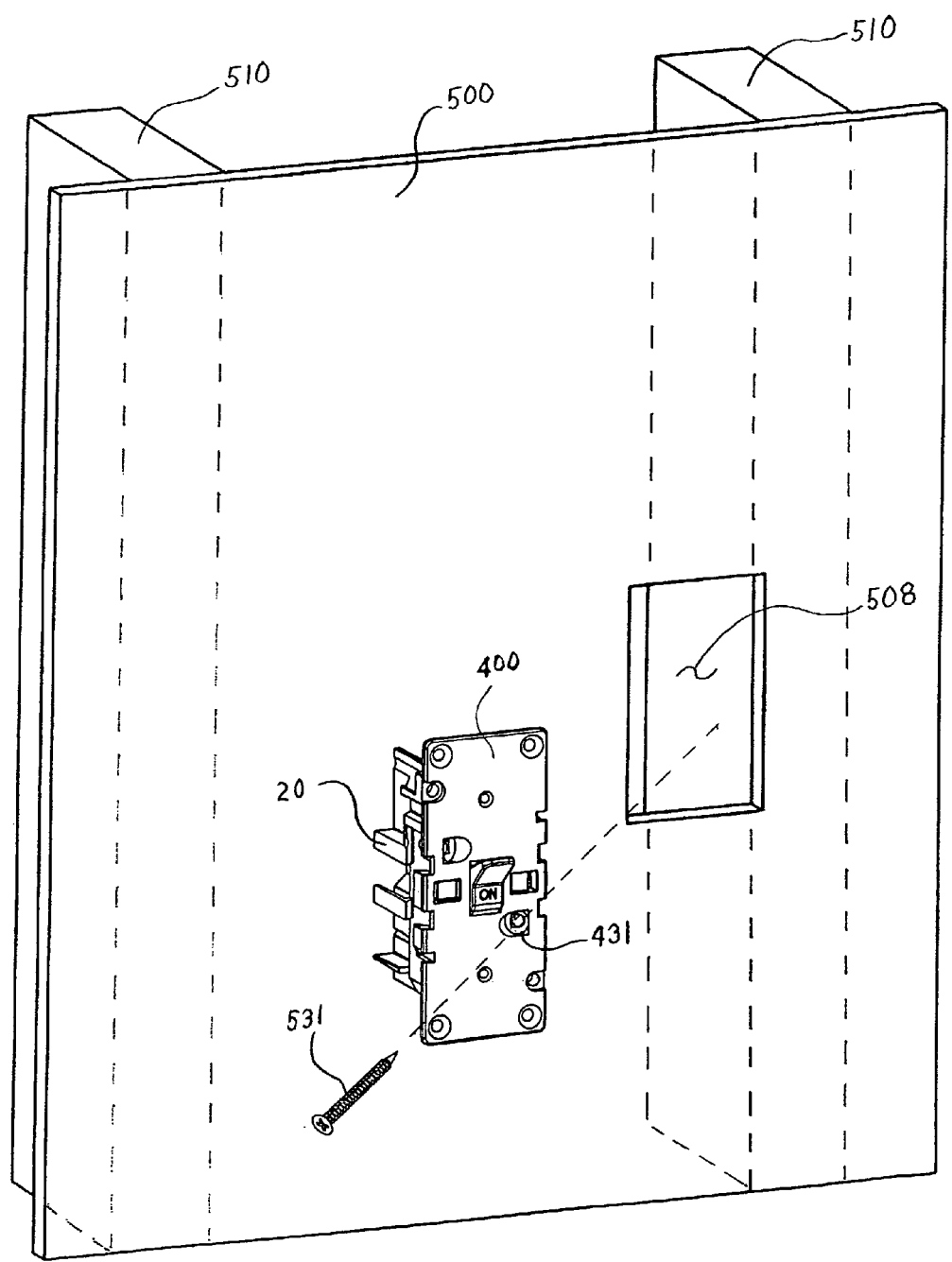
FIG. 8 is a perspective view in exploded form showing an enclosure of the present invention before being mounted to a wall and secured by a screw to a stud.

Referring to FIG. 8, the more typical arrangement is shown for attaching an enclosure 20 to a stud 510 located immediately adjacent an opening 508 of wall 500. In this case, a single screw 531 is used to secure to the housing directly to the stud 510. As can be seen from the foregoing, the present invention provides openings for a number of different mounting methods thus allowing the use of the enclosure in virtually any desired location Oil a wall.

Figures 2A, 2B:
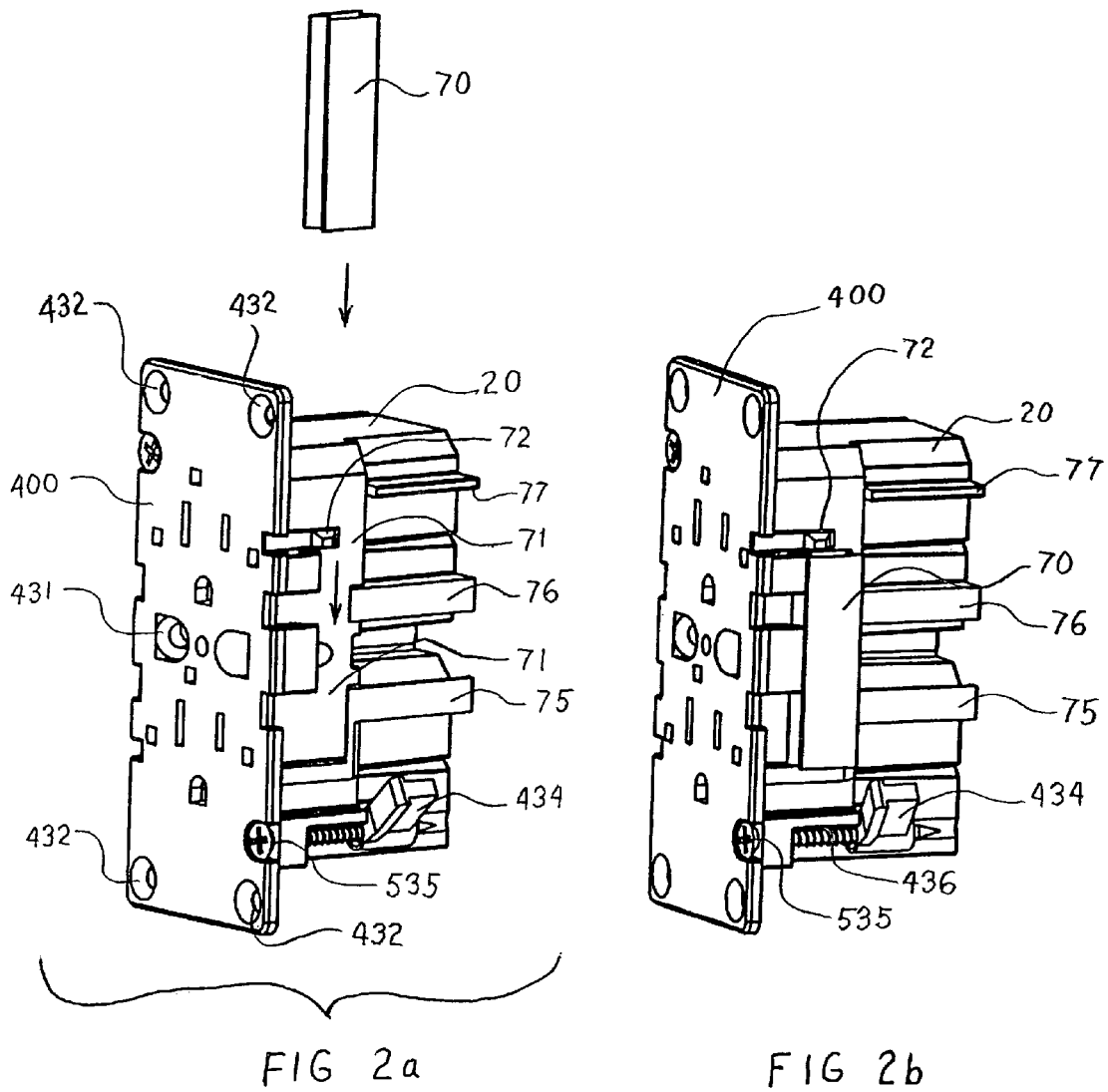
FIG. 2a is a perspective view of the enclosure of the present invention with a gang pin aligned for insertion.
FIG. 2b is a perspective view of the enclosure of FIG. 2a with the gang pin inserted.
Figure 2M:
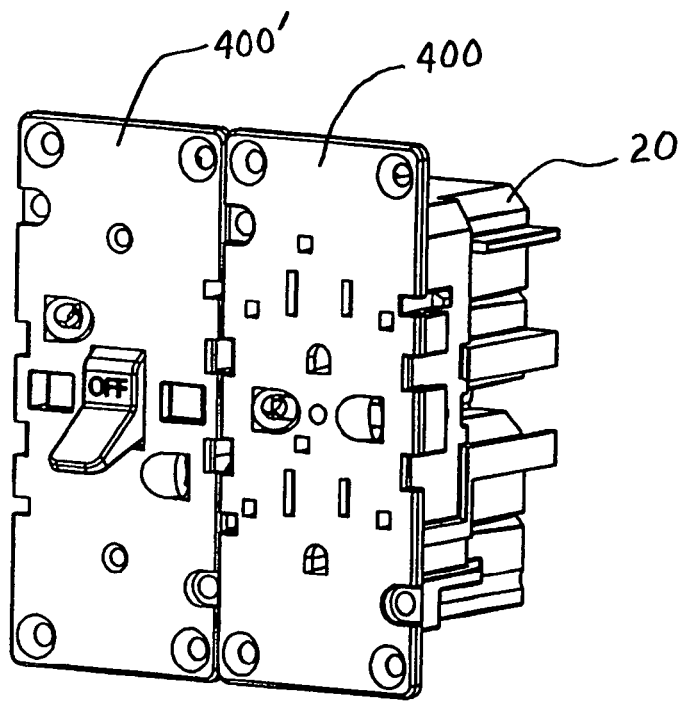
FIG. 2m is a perspective view showing a switch enclosure and a receptacle enclosure as ganged together.
Figure 2N:
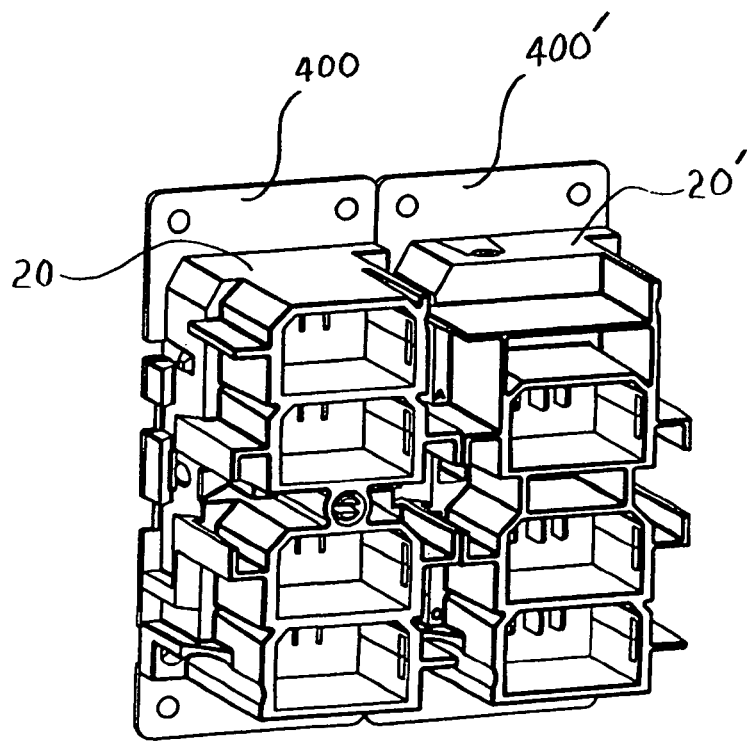
FIG. 2n is a rear perspective view of the ganged enclosures of FIG. 2m.
Figure 10:
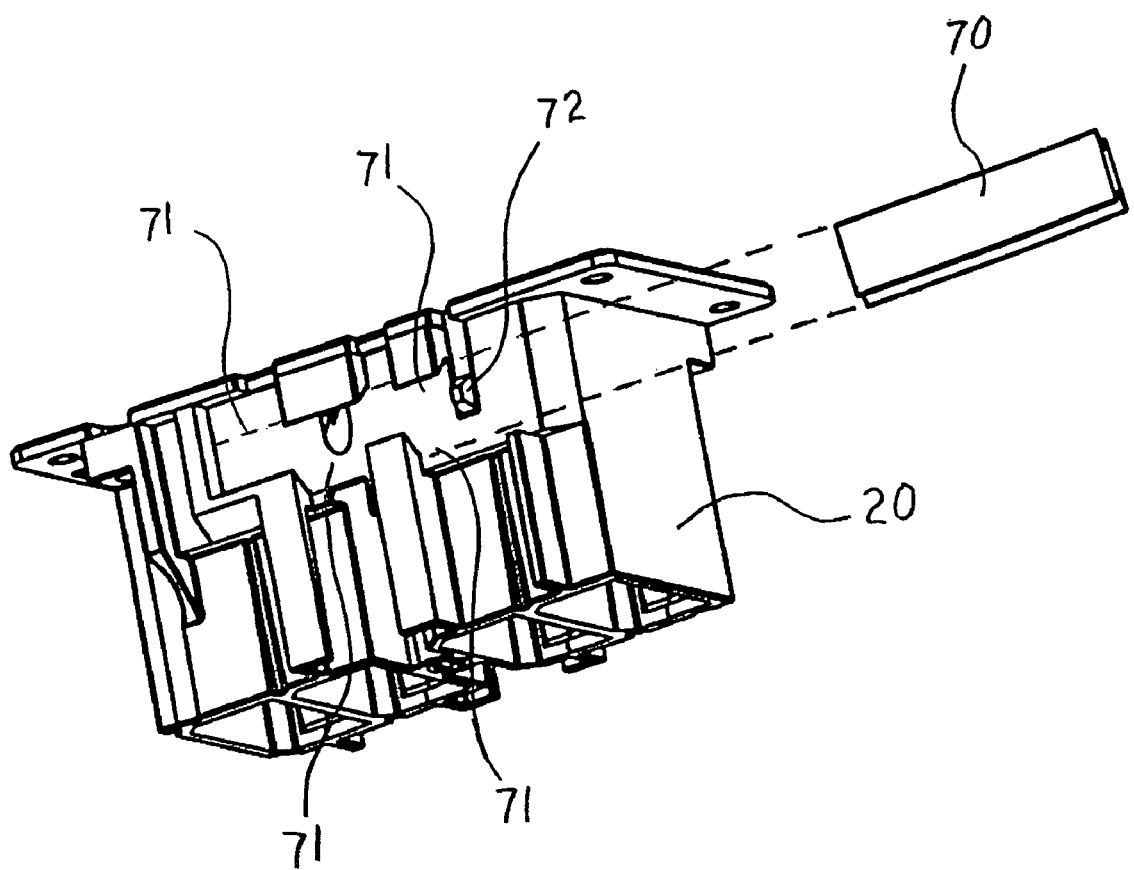
FIG. 10 is another perspective view showing the gang pin and gang pin channel.

Referring specifically to FIGS. 2a and 2b, it can be seen that a specially designed gang pin 70 provides a means of ganging together one or more devices for a typical installation by sliding the gang pin 70 into the channels or grooves 71 provided in the enclosure 20. FIGS. 2m and 2n show an enclosure 20 and an enclosure 20' as ganged together. Enclosure 20 has four (4) ports and a front plate 400 whereas enclosure 20' has only three (3) ports and is provided with a duplex front plate 400. Once the gang pin 70 is slid into the channel 71, a spring loaded gang pin retainer tab 72 is depressed inwardly as shown at 72 in FIG. 2a to allow the gang pin 70 to slide within the channel 71. Once the gang pin 70 is fully in place, as shown in FIG. 2b, the gang pin retainer tab 72 pops outwardly to hold the gang pin 70 firmly in place. The tab 72 can be manually depressed to allow for the subsequent removal of the gang pin 70 from the channel 71. An additional view of the gang pin 70 is shown in FIG. 10 which shows that the channel 71 is angled to receive grooves in the sides of the gang pin 70. Still referring to FIGS. 2a and 2b it can be seen that plural ribs 75, 76 and 77 are provided which allow the enclosure 20 to be self leveling when said ribs are abutted against a stud during the mounting process. Having such self leveling ribs 75, 76 and 77 provide a quick and convenient way to make sure that the enclosure is mounted in a proper vertical position and is oriented parallel with respect to the stud against which the ribs are placed.

Referring to FIGS. 2c, 2d and 2e, it can be seen that a switch cover 600 is attached to the front plate 400' by means of tabs 651 which are received by notches 451 in the front plate 400'. The switch cover 600 has an opening 618 therein through which a switch 418 extends.

Referring to FIGS. 2f, 2g and 2h, a receptacle cover 700 is shown which may be attached to front plate 400 by means of tabs 751 which secure into notches 451 in the front plate 400.

Alternatively, as shown in FIGS. 2i, 2j, 2k and 2l, it is possible to provide a pair of receptacle inserts 810 which include notched arm member 812, 814 and 816 which are received by openings 450 in the front plate 400. Once the inserts 810 are attached to the front plate 400, then a cover plate 800 having openings 811 (which are sized to receive the receptacle inserts 810) is screwed through screw opening 813 onto the enclosure 20. The purpose of the various receptacle inserts and cover plates described above are to provide an enclosure which has a look and appearance similar to that which the public has come to recognize as being a typical or conventional appearance.

The present invention is designed for safety and the use of less components therefore constituting ease of installation and labor savings.

It is to be understood that while certain forms of the present invention have been illustrated and described herein, the present invention is not to be limited to the specific forms or arrangements of parts described and shown.

We claim:

1. An enclosure for wiring devices comprising:
 a) a housing member, said housing member having a main front chamber, a main rear chamber and a central dividing wall separating said main front chamber from said main rear chamber, said housing having an open front leading to said main front chamber, said rear chamber being divided into a plurality of electrical feed ports through which electrical power is provided to and may be taken from said enclosure, said feed ports each having an open back providing access to said ports but not to said main front chamber;

b) a front plate member sized to completely cover and seal said open front of said main front chamber, said front plate member permanently attached to said housing whereby a fully enclosed factory sealed enclosure is created in said main front chamber, said main front chamber containing at least one wiring device of the type including receptacles and electric switches said front plate member having at least one opening therein adapted to receive one of a control member of a switch and hot, neutral and ground prongs of a grounded electrical plug which plugs into a receptacle of said rear chamber;

c) a hot bus extending between and interconnecting said feed ports, said hot bus having a hot bus segment extending through said dividing wall and connected to said at least one wiring device;

d) a neutral bus extending between and interconnecting said feed ports, said neutral bus having a neutral bus segment extending through said dividing wall and connected to said at least one wiring device;

e) a ground bus extending between and interconnecting said feed ports, said ground bus having a ground bus segment extending through said dividing wall and connected to said at least one wiring device.

2. An enclosure according to claim 1 wherein said enclosure has an exterior and said feed ports are accessible from the exterior of the enclosure.

3. An enclosure for an electrical wiring device according to claim 1 wherein three to four feed ports are provided in said main rear chamber with each of said ports capable of being connected to an electrical circuit and operating as one of an input port and an output port.

4. An enclosure according to claim 1 further comprising at least one snap or knock out cover is provided to completely cover said open back of said feed ports whereby removal of said snap or knock out cover can only be removed by the use of a screw driver exposes at least one of said feed ports for use.

5. An enclosure according to claim 1 further comprising of stud mounting holes provided in said housing for mounting said enclosure onto a stud in a wall by using a common drywall screw.

6. An enclosure according to claim 1 further comprising wood mounting holes provided on said housing for mounting said enclosure onto wood or hardboard.

7. An enclosure according to claim 1 further comprising screw clamp holes provided in said housing designed to accept a screw clamp for the mounting of said enclosure in the middle of a wall where no stud is present.

8. An enclosure according to claim 1 further comprising channels for accepting a gang pin for the purpose of ganging enclosures together.

9. An enclosure according to claim 8 further comprising a built in tab designed to move out of the channel area as the gang pin is inserted and then spring back into place to lock the gang pin in place, said tab being depressed manually for removal of the gang pin.

10. An enclosure according to claim 1 further comprising notches on said front plate for the purpose of accepting a designed wall cover plate.

11. An enclosure according to claim 1 further comprising said ports engineered to accept tabs on a receptacle insert cover.

12. An enclosure according to claim 1 further comprising built in ribs for self leveling.

13. An enclosure according to claim 1 wherein said enclosure is factory sealed and has an interior which is inaccessible to an installer.

* * * * *